United States Patent [19]
Rosenstrom

[11] Patent Number: 6,024,210
[45] Date of Patent: Feb. 15, 2000

[54] ELECTRICALLY COUPLED MULTIPLE SHAFT DRIVE SYSTEM FOR VIBRATING EQUIPMENT

[76] Inventor: Bo Richard Rosenstrom, 431 Ridgecrest Rd., Elizabethtown, Ky. 42701

[21] Appl. No.: 08/985,140

[22] Filed: Dec. 4, 1997

[51] Int. Cl.[7] ............................ B65G 27/20; B65G 27/34
[52] U.S. Cl. ............................................. 198/758; 198/770
[58] Field of Search ..................... 198/770, 609, 198/758

[56] References Cited

U.S. PATENT DOCUMENTS

| | | | |
|---|---|---|---|
| 3,659,465 | 5/1972 | Oshima et al. | 198/758 |
| 4,255,254 | 3/1981 | Faust et al. | |
| 5,064,053 | 11/1991 | Baker | 198/770 |
| 5,109,633 | 5/1992 | Durnil | |
| 5,131,525 | 7/1992 | Musschoot | |
| 5,392,898 | 2/1995 | Burgess et al. | |
| 5,404,996 | 4/1995 | Durnil | |
| 5,615,763 | 4/1997 | Schieber | 198/770 |

*Primary Examiner*—William E. Terrell
*Assistant Examiner*—Mark A. Deuble
*Attorney, Agent, or Firm*—Wheat, Smith & Beres; Vance A. Smith; Joan L. Simunic

[57] ABSTRACT

The control system of the present invention is particularly usable with extended vibration conveyors and permits the installation of a multiple of drive vibratory drive units comprised of one or more vibratroy modules. Each module comprises a motor, one or more shafts mounting eccentric weights, and a shaft encoder device monitoring the "relative position" of each shaft with respect for each shaft. One shaft, a master shaft, is driven continuously driven at a predetermined speed from which the actual relative positions are compared. A control device is programmed with the predetermined relative shaft positions and receives signals from the various encoder devices indicative of the actual relative positions of the shafts, compares the signals to a position of the master shaft and causes one or more motor control devices to alter the speed of each motor having a shaft whose actual relative position has varied from the predetermine relative position until the actual relative position essentially matches the programmed relative position.

12 Claims, 6 Drawing Sheets

ELECTRICALLY COUPLED MULTIPLE SHAFT DRIVE SYSTEM FOR VIBRATING EQUIPMENT

BACKGROUND OF THE INVENTION

This invention is related to a control system for vibratory conveyors and, more particularly, to a control system adaptable for use with vibratory systems having vibrating housings or surfaces of extended length for the conveying and/or treatment of articles in which the vibratory force is controlled over the entire length of the housing or surface.

There are a number of systems in which the vibratory motion providing direction and/or speed to material being conveyed by the conveyor is controlled. An example of such a system is set forth in U.S. Pat. No. 5,615,763 assigned to the same assignee of the present invention. As described therein with respect to one embodiment thereof, a pair of spaced shafts rotating in opposite directions are operatively coupled to a conveyor trough mounted on a stationary base through a plurality of isolating springs. The shafts have eccentrically mounted weights that are oriented such that the resultant force acting on the conveyor due to the rotation of the shafts and thus their associated weights goes through a maximum and minimum in a sinusoidal manner. The direction of the maximum resultant force is dependent upon the "relative phase angle" between the position of the rotating weights and a data plane. By varying the phase angle between the shafts, the direction or angle of attack of the resultant force can be changed so that the conveying rate and even the direction of the material on the conveyor can be changed. The invention in the aforementioned Patent addresses the problem of maintaining a predetermined phase angle for providing the desired angle of attack throughout an operating cycle of the conveyor through use of a control system. Such control system continuously measures the actual relative positioning of the weights, compares this to a programmed and predetermined positioning of the weights, and adjusts the speed of the motor driving one of the shafts until the actual positioning of the weights corresponds to the programmed positioning. Through the use of such a control system, the attack angle is maintained constant throughout the operating cycle of the conveyor.

While the above described system functions admirably for conveyors of standard and short lengths, many industries require extended treatment lengths of the material during processing. For example, long vibratory conveyors are frequently desired for heat transfer processing. When it is required to move material over such extended lengths such as, for example, spans exceeding about 30 feet, the use of a single unitary vibratory conveyor has heretofore been largely impractical. Extended length conveyors become unwieldy due, in part, to strength necessary to withstand the significant stress imposed on the frame of the conveyor by the vibratory system along its length. The size of the frame and concomitant cost become prohibitive. To address this problem, the manufacturers of vibratory equipment have found it necessary to employ two or more separate vibratory conveyors mounted end to end or having some technique of moving the material between the separated conveyors.

It is therefore a primary object of this present invention to provide a control system for a vibratory conveyor that permits the construction of a single unitary conveyor of extended length. It is still another important object of the present invention to provide for a control system for a vibratory conveyor that permits the tandem arrangement of a plurality of rotating shafts and eccentric weights to provide for a single angle of attack over the entire length of an extended unitary conveyor. It is still a further object of the present invention to provide for a control system for tumbling vibratory conveyors of extended lengths.

SUMMARY OF THE INVENTION

The objects of the invention set forth above are generally addressed by a vibratory control system in accordance with the present invention. Such a system generates a periodic resultant vibratory force from a plurality of separated driving "modules" to a unitary conveying surface and is capable of maintaining or changing the resultant vibratory force during operation thereof. For purposes of the description, vibratory "modules" are vibratory components typically comprised of a motor, one or more shafts driven by the motor, the eccentric weight(s) mounted on the shaft(s), and any shaft position monitoring devices that may be associated with the shafts. In some instances, two modules are combined to form a "linear force output drive unit" that is used to provide a periodic resultant force to the conveyor. The system generally includes a stationary frame connected by a plurality of spring members to a unitary conveying surface and a plurality of separated drive units operatively connected to the conveying surface and spaced along the length thereof with each of the drive units comprising two modules having respective spaced first and second shafts driven by respective first and second motors. Eccentric weights are mounted on each of the shafts. One of the modules is a master module with the first motor driving the first shaft at a programmed predetermined speed. A shaft position encoder device is associated with the end of each shaft and continuously generates a shaft position feed back signal indicative of the position of the eccentric weight on that associated shaft. A motion controller receives each of the shaft position feed back signals, compares each of the shaft positions with a predetermined relative phase angles or positions of the shafts, and generates a control signal for each of the shafts whose position has varied from the predetermined position. A motor speed controller responsive to the control signal for adjusting the speed of each of the motors associated with the shafts whose actual relative position has varied until the actual relative position matches the predetermined relative position.

DETAILED DESCRIPTION OF THE DRAWING

DETAILED DESCRIPTION OF THE PREFERRED EMBODIMENT

Figure 1:
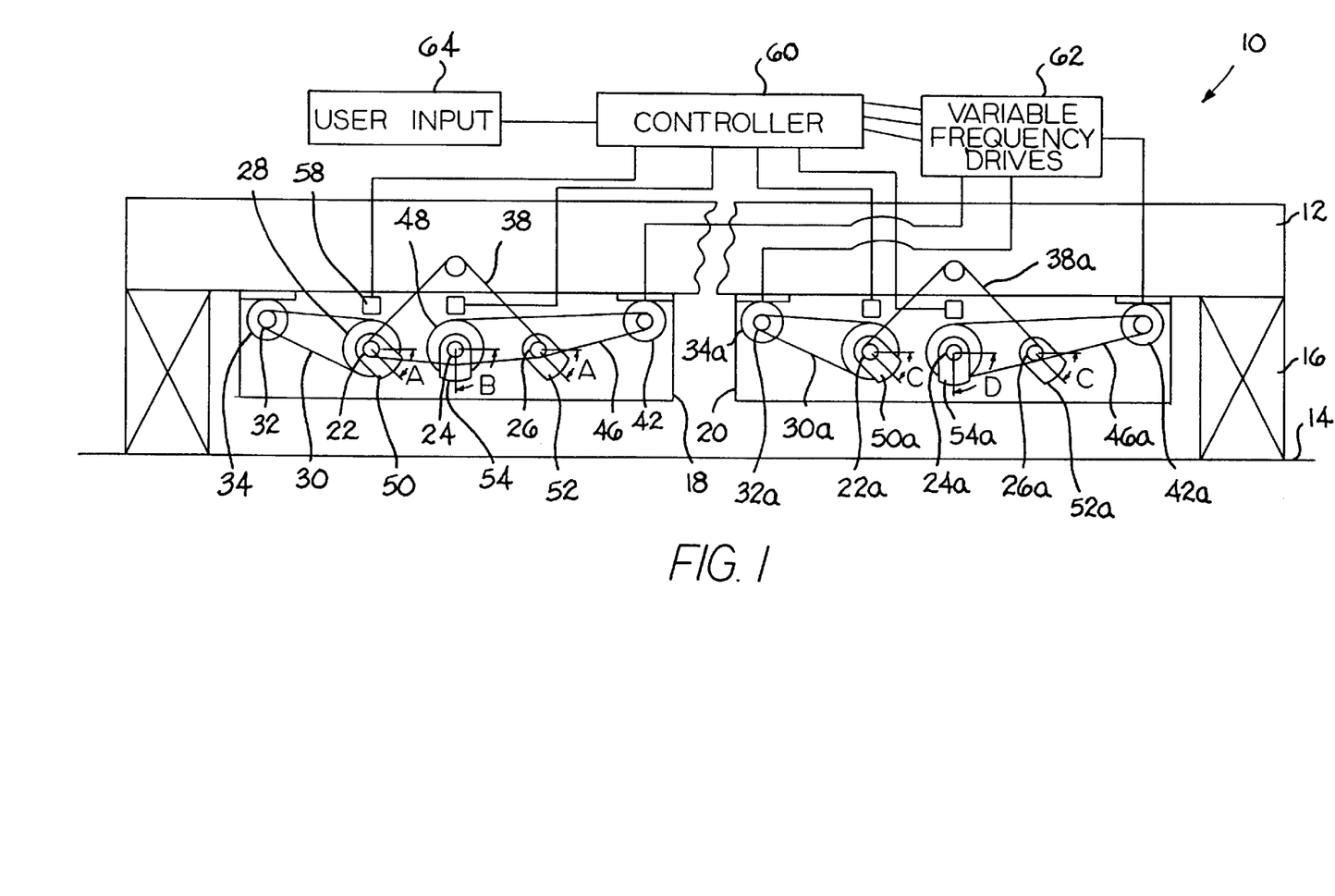
FIG. 1 is a blended schematic of a control system of the present invention in combination with a vibratory conveying apparatus showing a side view of the apparatus with a single conveying trough coupled to a pair of spaced vibratory drive units each having two modules comprising a motor and one or more rotating shafts mounting eccentric weights monitored by shaft encoder devices.
Figure 2:
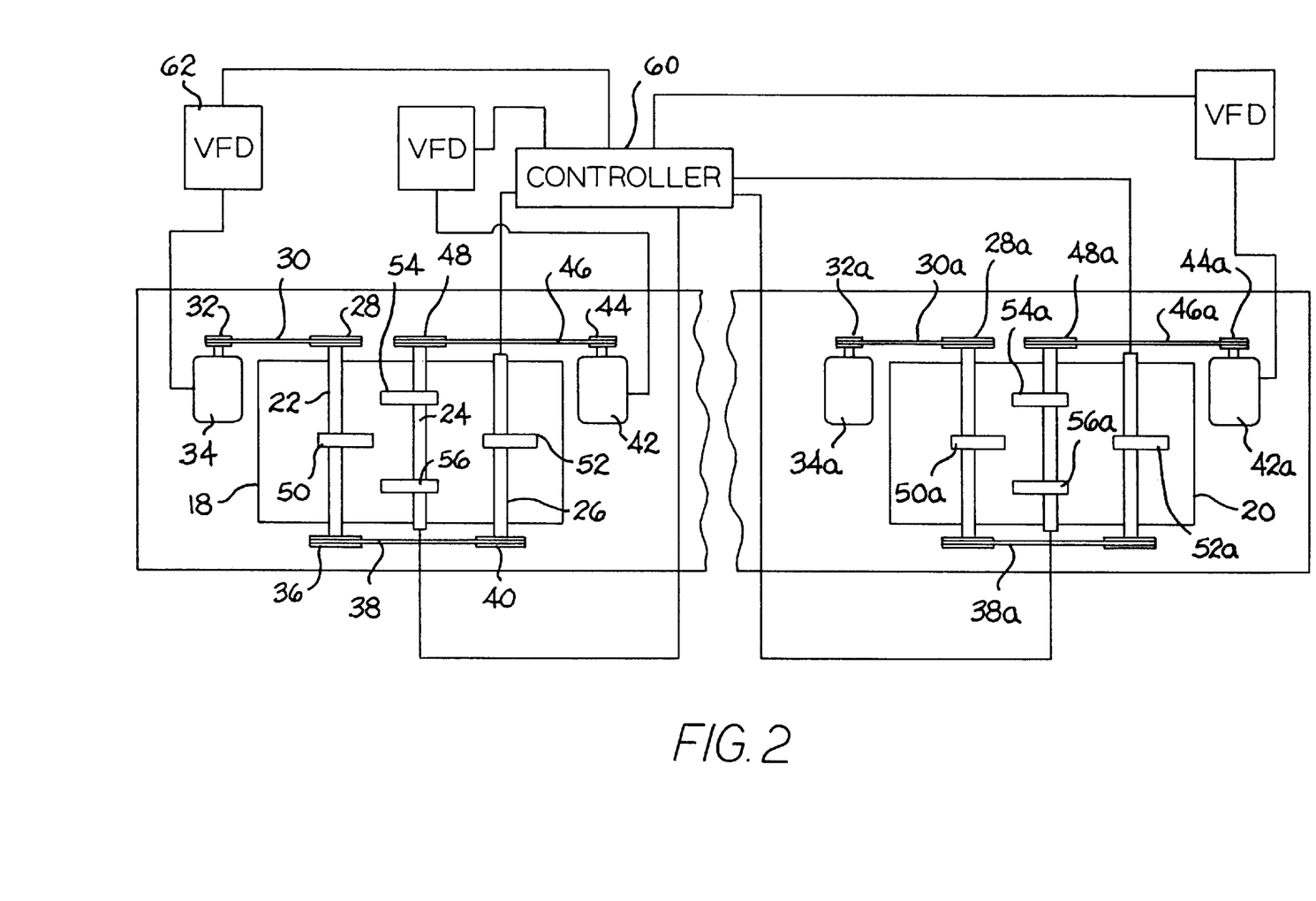
FIG. 2 is a top view of the embodiment of FIG. 1 showing the respective location of the eccentric weights and shaft driving elements.

Reference is first made to FIGS. 1 and 2 depicting a conveyor system generally noted by the character numeral 10. System 10 comprises a vibratory conveying surface or trough 12 mounted to a stationary base 14 by a plurality of springs 16. A break in the length of the trough 12 is shown to connote its extended length. The base 14 is rendered motionless and is typically fixed to the floor of the area in which the apparatus 10 is used. Springs 16 serve solely to isolate trough 12 from the base 14 and do not directly function to provide vibratory motion to the trough 12. Frames 18 and 20, may be secured to the under carriage of the trough 12 as shown or connected to the trough through plenum walls (not shown). Each frame 18 and 20 houses a vibratory drive unit that includes the motors, shafts, eccentric weights, and gearing that impart a linear force vibratory output to the trough 12. Each drive unit is comprised of a pair of modules as defined above. It is contemplated that the number of drive units could be replicated and used in larger numbers than the two shown for extremely long conveyors.

Referring now to the drive units within frame 18, it may be seen that three shafts 22, 24, and 26 are mounted for rotational movement within the frame 18. A pulley 28 is mounted on one end of shaft 22 and driven via belt 30 by pulley 32 of motor 34. A second pulley 36 is mounted on the other end of shaft 22 and is coupled by belt 38 to a pulley 40 mounted on one end of shaft 28. Thus, motor 30 drives both shafts 22 and 26 collectively with the aforementioned shafts and weights and form a first module. A second motor 42 has a pulley 44 coupled by belt 46 to a pulley 48 of shaft 26. Again, motor 24 along with pulley 44 and shaft 26 with weights form a second module within frame 18. Motors 34 and 42 are preferably secured to the under carriage of the trough 12. As best illustrated in FIG. 2, shafts 22 and 26 have eccentrically mounted weights 50 and 52 mounted intermediate the ends thereof. Although not required in all situations, the weights preferably have the same mass and angular orientation with respect to their associated shafts. A pair of eccentric weights 54 and 56 are mounted in a spaced apart relationship on shaft 24. When a linear stroke is required, it is preferable that the total mass of the weights 54 and 56 are approximately twice those of the individual masses of weights 50 and 52. However, it should be understood that a different weight structure may be employed to provide a different stroke distribution such as elliptical if desired.

The various elements of the modules of frame 20 generally have the same functional relationships as the elements described above in frame 18. For clarity, such elements of frame 20 are denoted by the same numerals followed by the letter "a". It is preferred that the eccentric weights in frame 20 have the same angular orientation and mass as the counter part weights of frame 18. The theory of operation of an eccentric weight vibratory conveyor is explicitly described in U.S. Pat. No. 5,064,053 incorporated by way of reference herein for its explanation of the theory. Briefly, however, the system set forth in FIGS. 1 and 2 operates upon the principal of altering the direction of the maximum resultant force acting on the conveyor due to the centrifugal forces imparted by the rotating eccentric weights. The maximum of the resultant force goes between a maximum and minimum in sinusoidal manner. The direction of the maximum resultant force is dependent upon the relative phase angle between the position of the rotating weights. For example, as seen in FIG. 1, shafts 22 and 26, with respective weights 50 and 52, have an angle A measured between an outwardly directed radial line from the center of the respective rotating shafts through the midpoint of the weights (or some other selected reference point on the shaft) and a data plane, e.g., a horizontal plane passing through the respective shafts. At the same point in time, each of the weights 54 and 56 mounted on shaft 24 has an angle B similarly measured. The centrifugal force generated by each of the rotating weights will be outwardly directed along the respective radial lines. The direction and magnitude of the movement imparted to the conveyor at a point in time is determined primarily by the resultant of the centrifugal forces of the rotating weights which in turn depends upon the relative position of the rotating eccentric weights with respect to each other. For example, if at a first point in time, angles A and B both have the same value, e.g., 135° in quadrant II, the magnitude of the resultant force would be at a maximum in that direction. Upon rotation of 90°, angle A is now 225° while angle B is 45°, thus the forces are pointing in the opposite directions and the resultant force is at a minimum. With an additional rotation of 90°, the forces are again pointing in the same direction, i.e., at 315° in quadrant IV, and the resultant force is at a maximum. A further rotation of 90° takes the resultant force back at the minimum. Thus, in any 360° rotation, the resultant force goes to the minimum and maximum values twice. By varying the relative positioning or relative phase angle between the shafts, the direction or angle of attack of the resultant forces can be changed so that the conveying rate (and even the direction of movement) of the material on the conveyor trough can be changed.

In the invention as illustrated in the environment of FIGS. 1 and 2, it is essential that each drive unit module provide the same angle of attack and the same magnitude of resultant forces. Thus, it is preferred that the counterpart shafts within frame 20 have eccentric weights of the same mass and angular orientation as those within frame 18. A control system for assuring the maintenance of the proper phase angles among the various rotating shafts is shown generally in FIG. 1 in which sensing or shaft encoder devices 58 are positioned adjacent each shaft 22, 24 and 22a, 24a. It should be recalled that shafts 26 and 26a are driven respectively by shafts 22 and 22a through a pulley and belt arrangement and thus always rotate at the same speed and thus have the same actual relative positions at all times. Such encoder devices 58 are well known in the prior art and are readily available, for example, from Danaher Controls of Gurnee, Ill., as indicated in the Table of Parts below. Each encoder device 58 senses a particular point on an associated rotating shaft and provides a continuous signal indicative of the relative position of the associated shaft. This information is fed to a controller 60 which compares the received signals to predetermined values for relative positions programmed into the controller. Controller 60 may be, for example, a programmable computer with a program to drive the motors and/or change the phase angles of the eccentric weights. When the controller 60 detects a deviation from the predetermined values, it causes one or more of the variable frequency drive units 62, as required, to adjust the speeds of an associated motor and relative phase angles of the associated shaft to match the predetermined value(s) for the relative positions.

TABLE OF PARTS

| COMPONENT | DESCRIPTION | COMPANY | PART NUMBER |
|---|---|---|---|
| Encoder (58) | Shaft Position Indicator Device | Danaher Controls Gurnee, IL | HS 35025083442 |
| Controller (60) | Computer with Program to Gear Drive Modules | Galil Motion Control Inc. Mountain View, CA | DMC-1530 |
| Variable Frequency Drive (62) | Variable Speed Motor Control Drive Device | Mitsubishi Electric Vernon Hills, IL | Freqrol A200 |
| Display (64) | User Interface | Eason Technology Healdsburg, CA | Eason 800 |

Figure 3:
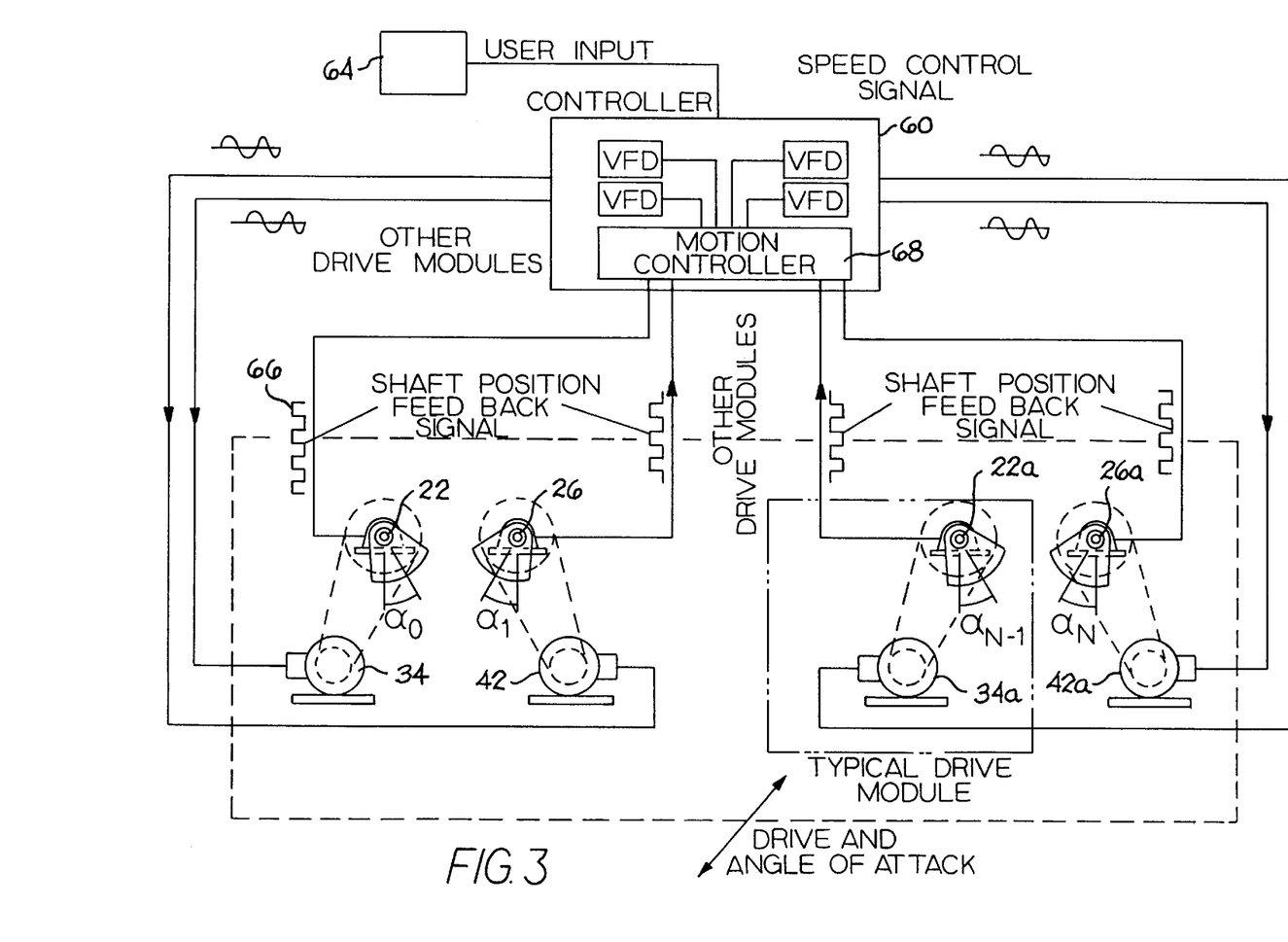
FIG. 3 is a schematic diagram showing the various control signals and communication between the motion controller, encoders, and motors of the apparatus of FIG. 1.
Figure 4:
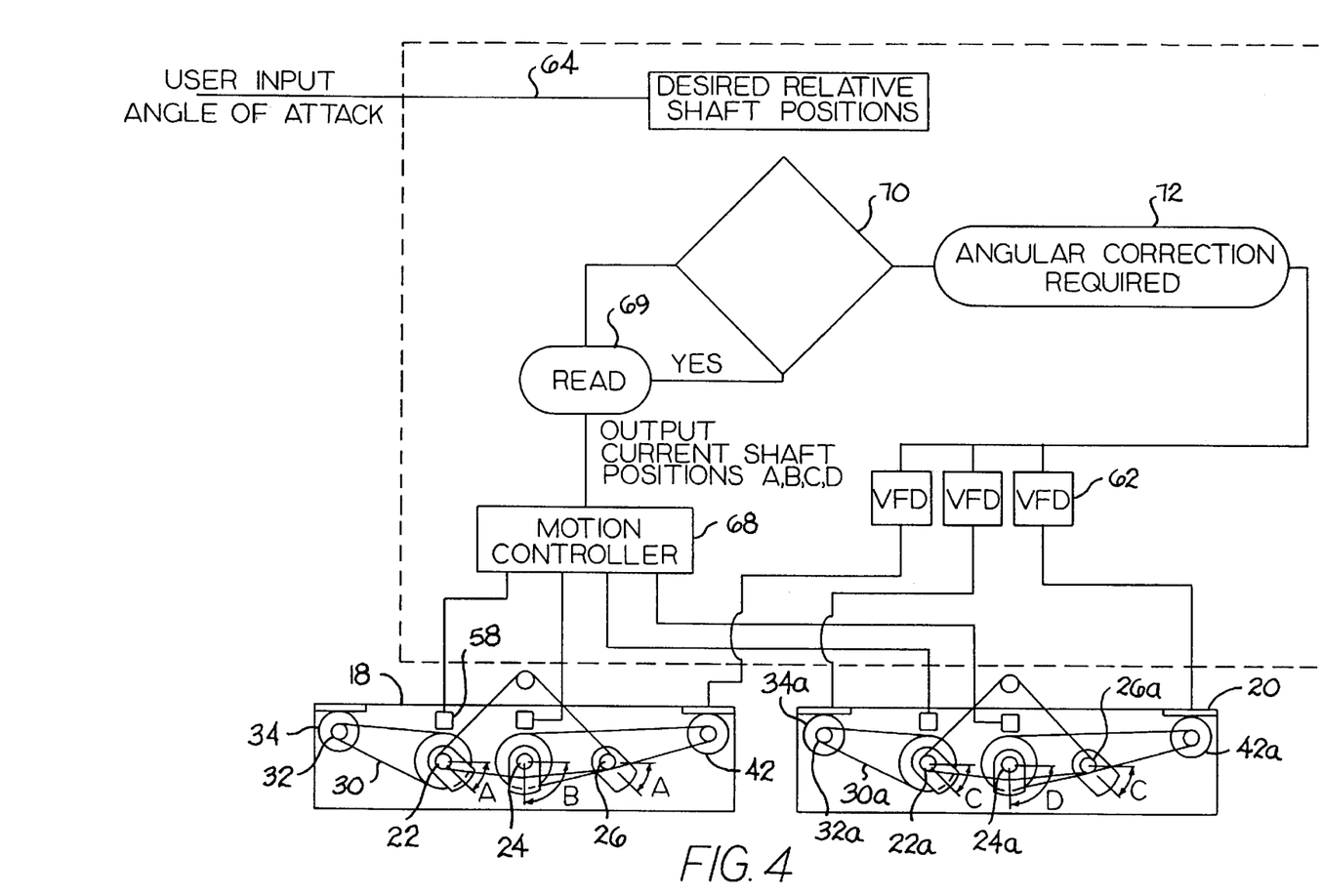
FIG. 4 is a schematic and flow diagram of the apparatus of FIG. 1 depicting the various routines used in comparing the predetermined relative position of a shaft of the master motor of the master module with the actual relative positions of the shafts of the slave modules and changing the actual relative positions to match the predetermined relative position.

Reference is now made to FIGS. 3 and 4 to better describe the operation of the present invention. For clarity, shafts 24 and 24a and their associated weights, pulleys, and belts are not shown in FIG. 3. Initially, the user programs the controller 60 as represented by input arrow 62 with a desired angle of attack as represented by the relative phase angles or positions for the various shafts into controller 60. Additionally the master shaft is provided a predetermined rotational speed. Thus, the controller 60 calculates the appropriate relative phase angle or the predetermined relative position for each shaft 26 and 22a and 26a. It should be noted that the predetermined relative position of shaft 22a will ordinarily be programmed to be the same as that of shaft 22 although in some situations this may not be true. In a perfect system, the actual relative positions of the various shafts would be completely matched to the predetermined positions and maintained at all times during operation. However, shafts speeds will vary from time to time due to many external influences. These minor changes can over a period of time greatly vary the actual relative positions and thus influence the angle of attack to the detriment of the proper operation of the conveyor system. The encoder devices 58, however, are continuously monitoring the rotating shafts and provide a "shaft position feed back" signals 66 to the motion controller 68 of controller 60. The motion controller then reads the signals 66 at READ 69, compares the actual relative position of the shafts using the predetermined speed of the master shaft, and determines at comparison routine 70 if the shaft position of the shaft associated with a particular signal 66 has the predetermined relative phase angle or position inputted into controller 60. If YES, meaning the real relative phase angle matches the relative phase angle, then a continuous loop occurs. If NO, then an angular correction is required in the positioning of the "slave" shaft, e.g. shafts 26, 22a or 26a, to match the predetermine relative phase angle between the "master" shaft 22 and the slave shaft. To make this correction, a determination is made at calculation 72 of the change of speed needed for the slave shaft to bring it back to the proper relative phase angle. A variable frequency drive 62 adjusts the speed of appropriate slave motor, e.g. motor 42, 34a, or 42a, to cause the associated shaft to rotate relative to the master shaft to reach the proper relative phase angle and thereafter maintained at the same speed as the master shaft.

The foregoing illustrates that the present invention may incorporate a multiplicity of drive units each comprised of one or more vibratory modules. Unitary conveyors of considerable length may be constructed employing a number of vibratory drive units as dictated by the conveyor length. This provides a solution to the problem posed by need to have systems that convey and/or treat materials over long lengths of vibratory surfaces.

Still another use for the present invention is with vibratory systems of the tumbling type, primarily used to clean work pieces, separate the work pieces from coatings, or otherwise treat the work pieces through the vigorous tumbling action of the work pieces against each other and/or media having certain treatment characteristics such as abrasiveness, for example, in a vibrating housing of the system. Such systems are well known in the prior art. One system is described in U.S. Pat. No. 5,109,633 to Durnil assigned to the same assignee as the present invention in which the system causes the loci of points on the tumbler housing surface to have an elliptical motion path thereby providing an inward tumbling movement of the work pieces and media contained by the housing. Heretofore, such tumbling apparatus were limited in size due to mechanical constraints imposed by the components used in vibrating the work piece containing housings and the structure of the apparatus itself. Typically, a single vibrating drive unit with a pair of modules was used to provide the particular vibration characteristics necessary to effect appropriate and desired tumbling within the housing. Any additional vibrating drive unit, if employable, was mechanically coupled together with the first drive unit to ensure that drive units provided the same vibration characteristics to the housing.

Figure 5:
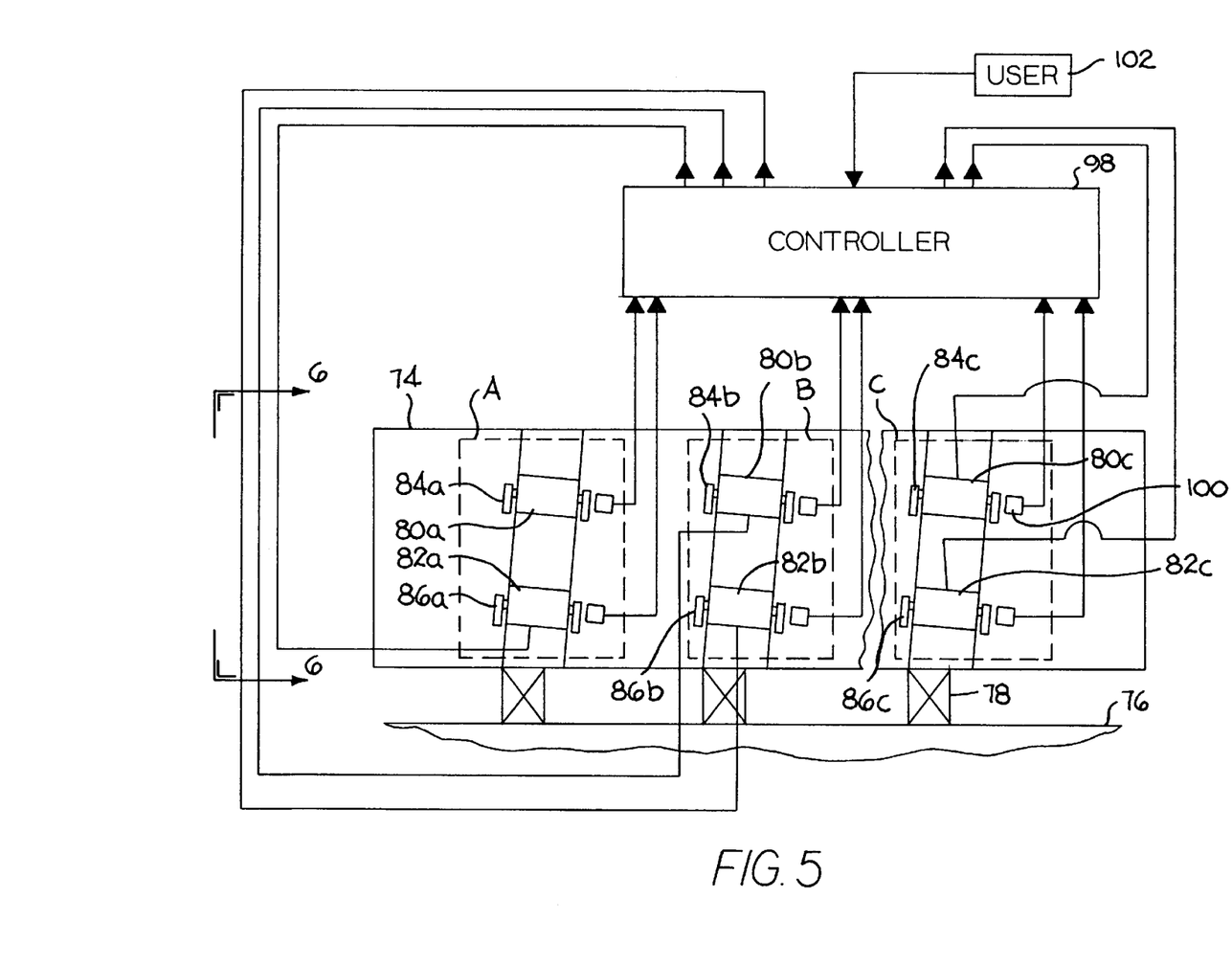
FIG. 5 is a blended schematic of a control system in accordance with the present invention in combination with a vibrating tumbling apparatus shown in side view wherein the apparatus has a single tumbling housing operatively connected to three spaced vibratory drive units each comprising a pair of modules having a single motor, a pair of rotating shafts with eccentric weights, and a shaft encoder monitoring device.
Figure 6:
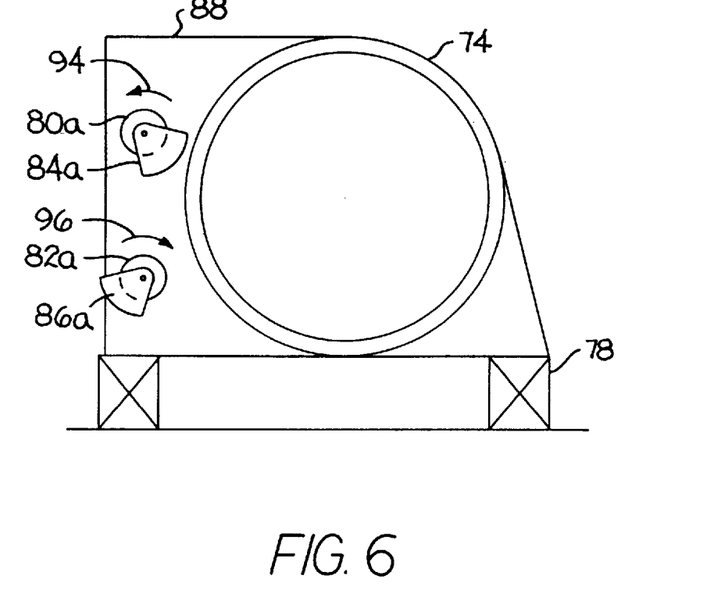
FIG. 6 is a sectional view taken along lines 6—6 of FIG. 5.
Figure 7:
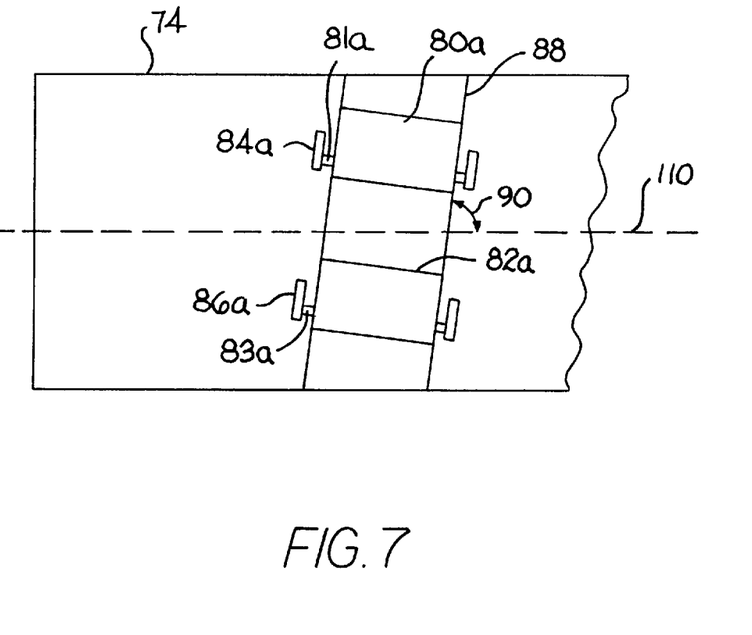
FIG. 7 is an enlarged view of one of the modules of FIG. 5.

FIGS. 5, 6, and 7 are illustrative of a control system in accordance with the present invention that provides a superior tumbling apparatus when used particularly in combination with the tumbling type of system described in the above mentioned patent. As best seen in the blended schematic of FIG. 5, a cylindrically shaped housing 74 is isolated from a base 76 through a plurality of springs 78. The housing 74, while illustrated as cylindrical, could have any arcuate configuration, particularly with respect to the bottom half, that is conducive to appropriate tumbling action. Vibration is provided by a plurality of vibratory drive units illustrated by the dashed lines as modules A, B, and C. It should be understood that the number of drive units that should be employed is largely a function of the length of the housing 74 and the materials comprising the housing and supporting infrastructure. Each drive unit A, B, C as shown is comprised of two modules each having a motor, a pair of shafts driven by each motor with the distal ends of each shaft mounting an eccentric weight. For convenience, the motors, shafts, and the associated weights of the drive units A, B, C are distinguished from each other with consistent letter subscripts matching the character letter designation of the drive unit in which the motors, shafts, and weights are positioned. For example, motors 80a, 82a are in unit A while motors 80b, 82b, and motors 80c, 82c are in units B and C, respectively. Each motor of the units A, B, and C is mounted between a pair of brackets 88 extending outwardly from the wall of housing 74. The left and right shafts 81a–c, 83a–c of each motor 80a–c, 82a–c respectively mount eccentric weights 84a–c, 86a–c that provide the centrifugal force when rotated. The axes of shafts 81a–c and 83a–c lie in planes that are substantially parallel to the longitudinal axis 110 of the housing 74 (as best seen in FIG. 7). Thus, the eccentric weights 84a–c and 86a–c rotate in planes that are substantially perpendicular to the longitudinal axis 110. While not required in all situations, the eccentric weights in the various units preferably have the same mass.

FIG. 7 shows an expanded drive A and illustrates that the eccentric weights 84a and 86a on the left side of their motors respective rotate co-planarly as do the eccentric weights 84a and 86a on the right side of their respective motors. The same co-planar relationship is involved between the left and right weights 84b, 86b and 84c, 86c. Moreover, each drive unit is tilted with respect to the vertical and inclined an angle 90 shown between the brackets 88 and the axis toward one end of the housing 74 for reasons set forth below. Finally, as best seen in the side section of FIG. 6, the weights 84a and 86a, while rotating in the same plane, also rotate in opposite directions depicted by arrows 94 and 96. Again, the same counter rotating relationship holds true for weights 84b, 86b and 84c, 86c.

The theory of operation of the vibrating system illustrated in FIGS. 5, 6 and 7 is set forth in detail in the aforementioned U.S. Pat. No. 5,109,633 (with particular reference to FIGS. 30 and 31 thereof) in which a single module comprising the drive unit has a motor driving a pair of spaced and counter rotating shafts each have eccentric weights of the same mass mounted to rotate co-planarly. The shafts illustrated in U.S. Pat. No. 5,109,633 are mechanically coupled so that the shafts rotate at the same speed and thus maintain the same relative position as dictated by the single motor. The discussion of the theory of operation as set forth in U.S. Pat. No. 5,109,633 is identical to the present invention set forth in FIGS. 5, 6, and 7 and is incorporated by way of reference herein. Basically, however, the effect of the counter rotating and spaced apart eccentric weights rotating in the same plane is to cause points on the internal surface of housing 74 to follow an elliptical path. The media contained by the housing 74 is caused to move or flow circumferentially across and climb upwardly of the bottom portion of the housing 74 and is thrown inwardly of the housing along with the work pieces being treated. The inclination of the weights as discussed above tends to cause the media and work pieces to move slowly in the direction of the inclination. Alternatively, while not shown here, the housing 74 could be inclined in the opposite direction so as to cause the enclosed material to move in the direction of housing inclination with the inclination of the weights acting to retard this movement.

To address the problem of treatment environments in which the articles are preferably treated over long treatment lengths where it would be desirable to utilize an extended vibrating and tumbling housing, those in the prior art have resorted to a partial solution in which a first pair of counter rotating weights are coupled mechanically to a second pair of counter rotating eccentric weights. This partial solution maybe seen in FIG. 29 of the aforementioned U.S. Pat. No. 5,109,633. This structure, however, is quite limited in its application, providing a much greater opportunity for mechanical failure and adding considerably to the complexity of the machinery. Applicant, however, has determined that a control system in accordance with the present invention may easily be combined with the desired vibratory system for tumbling that addresses the problem of extended vibratory housings. From the view of FIG. 5, it may be seen that the extended length of housing 74 is again connoted by a break in the length thereof. Each of the shafts 81a–c and 83a–c are monitored by encoder devices 100 that provide continuous inputs representing the actual relative position of the monitored shafts to a controller 98 that incorporates variable frequency drives (as described above) to control the speed of motors 80a–c and 82a–c. As discussed previously with respect to FIGS. 3 and 4, the controller 98 compares this information to a predetermined relative position programmed into the controller 98 by user input device 102.

One motor, for example, motor 80a, making up one module (the "master" module) may be considered the master motor that is continuously driven at a predetermined speed. When one or more of the other motors called the "slave motors", e.g., 80b–c or 82a–c, making up the respective other modules (the "slave" modules), drifts away from the programmed relative position as monitored by the respective shaft encoders 100 of the various slave modules, the controller 98 increases or decreases the speed of rotation of the identified slave motor(s) and associated shafts to make the shafts match the programmed relative positions for the identified shafts. From this it may be seen that mechanical coupling is completely eliminated while the proper speed of all motors/shafts are maintained at the programmed speed so that the characteristic of the force applied to the housing is consistent along the entire length of the housing. This permits the use of a unitary tumbling housing of considerably greater length than was heretofore possible without the concomitant increase in the mechanical complexity and structural strength of the conveyor necessary with mechanically coupled vibratory devices.

From the above discussion, it may be seen that the vibratory control system in accordance with the present invention addresses the significant problems of the prior art systems, particular where it is necessary to utilize a vibrating surface or housing of considerable length to treat or convey articles. Modifications of the control system will become readily apparent to those with ordinary skilled in the art without departing from the scope of the invention as set forth in the appended claims.

I claim:

1. A vibratory conveying system for generating a periodic resultant vibratory force to a conveying surface, said system maintaining or changing said resultant vibratory force during operation thereof and comprising:

(a) a conveying member including the conveying surface;

(b) a stationary frame;

(c) a plurality of spaced spring members extending between and connecting said stationary frame to said conveying member;

(d) a plurality of vibratory drive units mounted to said conveying member and spaced along the length thereof, each of said drive units including a first module with a first motor rotating at least one shaft with an eccentrically mounted weight thereon in a first direction and a second module with a second motor rotating at least one other shaft with an eccentrically mounted weight thereon in a direction opposite to the first direction, said first module being a master module with said first motor thereof rotating its shaft at a predetermined speed and the remainder of said modules being slave modules;

(e) a shaft position encoder device associated with each of said shafts of said modules for continuously generating a shaft position feed back signal for each of said shafts of said module;

(f) a motion controller programmed to receive a predetermined relative positions of said shafts and including (i) means for receiving each of said shaft position feed back signals and determining an actual relative position of said shafts, comparing each of the shaft positions of said slave modules with said predetermined relative position, and generating a control signal for each of said shafts of said slave modules whose actual shaft position has varied from said predetermined relative shaft position and (ii) motor speed controller responsive to said control signal for adjusting the speed of each of said motors of said slave modules whose associated shaft has varied from said predetermined relative position until said actual relative position of said associated shaft matches said predetermined relative position.

2. The system of claim 1 in which said conveying surface conveys in a direction substantially perpendicular to said shafts of said modules.

3. The system of claim 2 in which said first module has first and second shafts, said first and second shafts being mechanically coupled so that said one motor drives both shafts at essentially the same speed, and said another shaft of said second module is mounted between said first and second shafts.

4. The system of claim 3 including a multiplicity of drive units.

5. The system of claim 1 in which said conveying surface has an arcuate configuration with a longitudinal axis extending in a direction essentially parallel to said shafts of said modules.

6. The system of claim 5 in which each of said shafts has an axis in a plane substantially parallel to a longitudinal axis of said conveyor surface.

7. The system of claim 6 in which there are a multiplicity of drive units spaced along said conveyor surface.

8. A vibratory work piece treating system for the tumbling and conveying of work pieces in which an elongated arcuate surface defines a longitudinal axis extending substantially in the direction of elongation, said system comprising:

(a) a work piece moving member including said elongated arcuate surface;

(b) a stationary base;

(c) a plurality of spaced isolating springs extending between and connecting said work piece moving member to said stationary base;

(d) a plurality of vibratory drive units mounted to said member with each unit having a pair of modules, each of said modules having a motor and rotatable shafts with eccentrically mounted weights, said shafts rotating in a plane substantially parallel to said longitudinal axis and said weights are rotated in substantially the same plane, said vibratory drive units imparting an elliptical path to points on said arcuate surface, one of said modules of said system being a master module with said motor thereof being a master motor driving said shaft thereof at a predetermined speed and the remainder of said modules being slave modules;

(e) a shaft position encoder device associated with each shaft of each module for continuously generating a shaft position feed back signal for each of said shafts;

(f) a motion controller programmed to receive predetermined relative positions for said shafts and including (i) means for receiving each of said shaft position feed back signals, comparing actual relative shaft positions with said programmed relative shaft positions, and generating a control signal for each of said shafts of said slave modules whose actual shaft position varies from said predetermined relative position and (ii) motor speed controller responsive to said control signal for adjusting the speed of each of said motors of said slave modules whose associated shaft has an actual relative position different from said predetermined relative position until said associated shaft has an actual relative position matching said predetermined relative position.

9. The system of claim 8 in which said shafts are tilted with respect to said longitudinal axis.

10. The system of claim 9 in which said eccentric weights have essentially the same mass.

11. The system of claim 10 in which said arcuate surface is a portion of the internal surface of a cylinder and said longitudinal axix extends parallel to a central axis of said cylinder.

12. The system of claim 8 including a multiplicity of drive units spaced along said surface.

* * * * *